United States Patent [19]

Segalla

[11] Patent Number: 4,811,675
[45] Date of Patent: Mar. 14, 1989

[54] APPARATUS FOR AUTOMATIC AND CONTINUOUS DISPENSING OF FOOD IN FEEDING TROUGHS FOR BATTERY-REARED POULTRY

[75] Inventor: Ruggero Segalla, Vicenza, Italy
[73] Assignee: Ska S.P.A., Vicenza, Italy
[21] Appl. No.: 71,271
[22] PCT Filed: Oct. 17, 1986
[86] PCT No.: PCT/IT86/00076
  § 371 Date: Jul. 14, 1987
  § 102(e) Date: Jul. 14, 1987
[87] PCT Pub. No.: WO87/02547
  PCT Pub. Date: May 7, 1987
[30] Foreign Application Priority Data
  Oct. 23, 1985 [IT] Italy ........................................ 85606
[51] Int. Cl.$^4$ ............................................ A01K 39/012
[52] U.S. Cl. .................................................. 119/52 B
[58] Field of Search ................... 119/18, 52 B, 52 AF

[56] References Cited

U.S. PATENT DOCUMENTS

| | | | |
|---|---|---|---|
| 3,664,302 | 5/1972 | Wienert | 119/18 |
| 4,337,729 | 7/1982 | Peppler et al. | 119/52 B |
| 4,597,361 | 7/1986 | Tudela | 119/52 B |
| 4,672,917 | 6/1987 | Fox | 119/52 B X |

FOREIGN PATENT DOCUMENTS 519175  7/1976  U.S.S.R. ............................ 119/52 B

*Primary Examiner*—Robert P. Swiatek
*Attorney, Agent, or Firm*—Bucknam and Archer

[57] ABSTRACT

The equipment comprises a hopper (1), vertically mobile by means of chain (2) along a column (3), which is in turn guided by means of rollers (5, 7, 8) on rails (4 and 6), so as to supply the feeding-troughs uniformly at the different levels.

4 Claims, 2 Drawing Sheets

APPARATUS FOR AUTOMATIC AND CONTINUOUS DISPENSING OF FOOD IN FEEDING TROUGHS FOR BATTERY-REARED POULTRY

The object of the present invention is to provide equipment by which feed can be dispensed automatically and continuously into the feeding-troughs of batteries of cages on several levels, for poultry keeping, in particular for laying hens or also for other types of rearing.

It is known, particularly in laying hen instalations, that they have to be provided with very regular and constant feed, though it must be possible to adjust the quantity on the basis of the growth of the animals being reared.

It is known, that a present feed is dispensed into the feeding-troughs of batteries of cages on one or several levels by means of equipiment that does not allow uniform dispensing of the feed, which is greatly prejudicial to the results obtained.

With the use of the equipment in accordance with the invention, however, the feed is dispensed automatically and continuously along each row of feeding-troughs, breaking off in the gap between one row and the next and resuming along the adjoining row of feeding-troughs, until dispensing is finished on a specific level.

Next, when the dispensing screw has been transferred to the following level, e.g. the level below, feed is dispensed into the feeding-troughs on this next level and the whole operation is thus repeated until all levels of feeding-troughs have been supplied.

One of the essential characteristics of the equipment is due to the fact that the quantity of feed to be dispensed is adjusted by altering the rate of advance of the screw previously located on the bottom of the dispenser.

An essential characteristic of the device is the face that the feed is dispensed with complete uniformity into all the feeding-troughs and at each level, in the required quantity and in a manner entirely adjustable at will.

The invention will now be described in greater detail with the help of the attached plates of drawings, in which.

Figure 1:
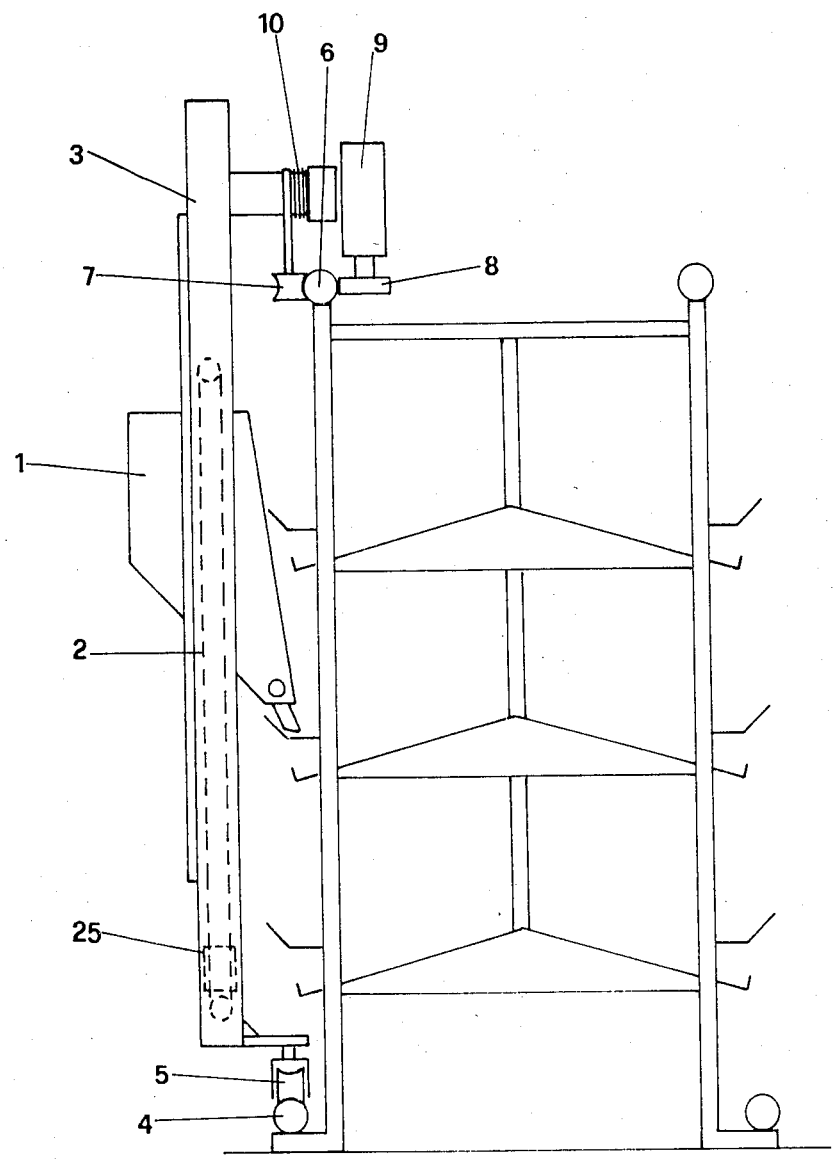
FIG. 1 shows a diagrammatical front view of a battery of cages, with the equipment according to the invention mounted on it.

The equipment according to the invention comprises a dispensing hopper 1 (FIG. 1), mounted on a mobile chain 2, which makes it possible to locate it at the required height on the supporting upright 3.

The latter is mobile on the bottom tubular rail 4, on which the shaped rollers 5 rest, while at the top it can slide on the tubular rail 6, this, too, being fixed to the framework bearing the cages, while shaped roller 7 rotates on a vertical pin fixed to an arm projecting from upright 3, while roller 8, equipped with a driving motor 9, moves the upright 3 along the side of the framework bearing the cages. The shaped roller 7 is advantageously fixed elastically to the framework via spiral spring 10, so as to provide elastic adherence between roller 8 and rail 6.

Figure 2:
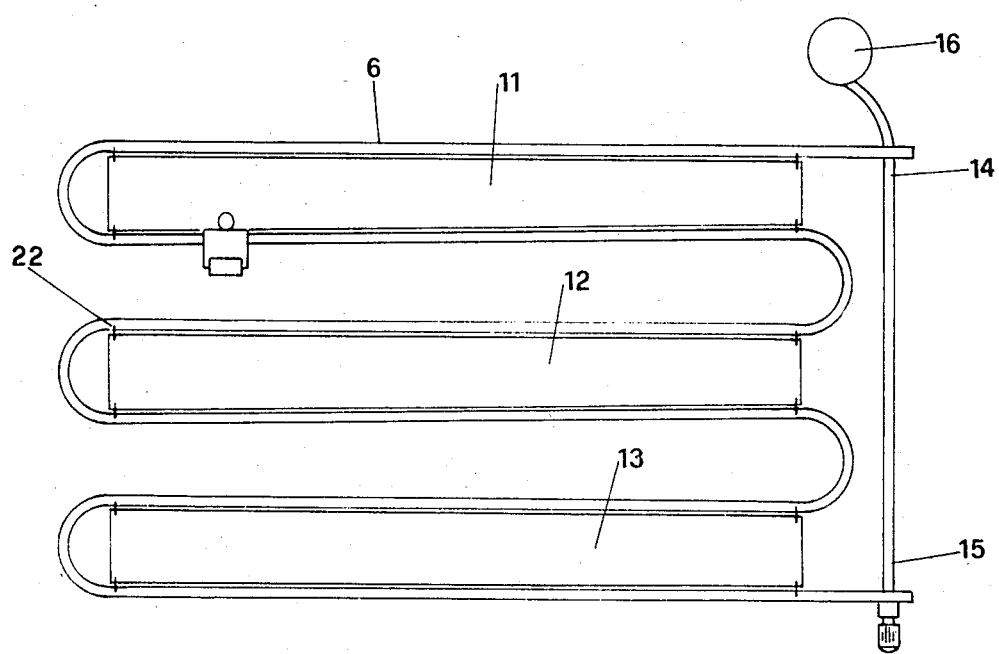
FIG. 2 shows a diagrammatical top planar view of the equipment for supplying a series of batteries of cages.

FIG. 2 shows the planimetric course of rail 6, which alternating course is fixed along both sides of each battery of cages, indicated diagrammatically in the drawing by the numerals 11, 12 and 13.

During the travel of hopper 1, in unloads the feed exclusively in the rectilinear sections corresponding to each battery of cages, in order to tip the predetermined quantity of feed into the feeding-troughs, along these stretches only.

The dispensing screw is therefore fitted with a closing device which operates automatically, touching a stop component 22, in correspondence with each rectilinear stretch, to remain motionless, due to the stopping of the motor, in the ensuing curved stretch and start again on the next rectilinear stretch.

At the end of one passage along all the batteries of cages, e.g. on the first level, the driving motor of the chain 2 (FIG. 1) comes into operation automatically and lowers hopper 1, so as to bring it to the level of the next feeding-troughs, after which the travel to supply this second level starts, along which the dispensing screw returns to point 14, where it will again descent one level to start supplying the feeding-troughs located at this new level.

The entire cycle is thus repeated going up the various levels until the first is reached or else there is a return to the first level and the cycle is repeated at the pre-set times. When the feed contained in hopper 1 is exhausted, the hopper is refilled from a special silo 16, both at position 14 and at position 15.

Figure 3:
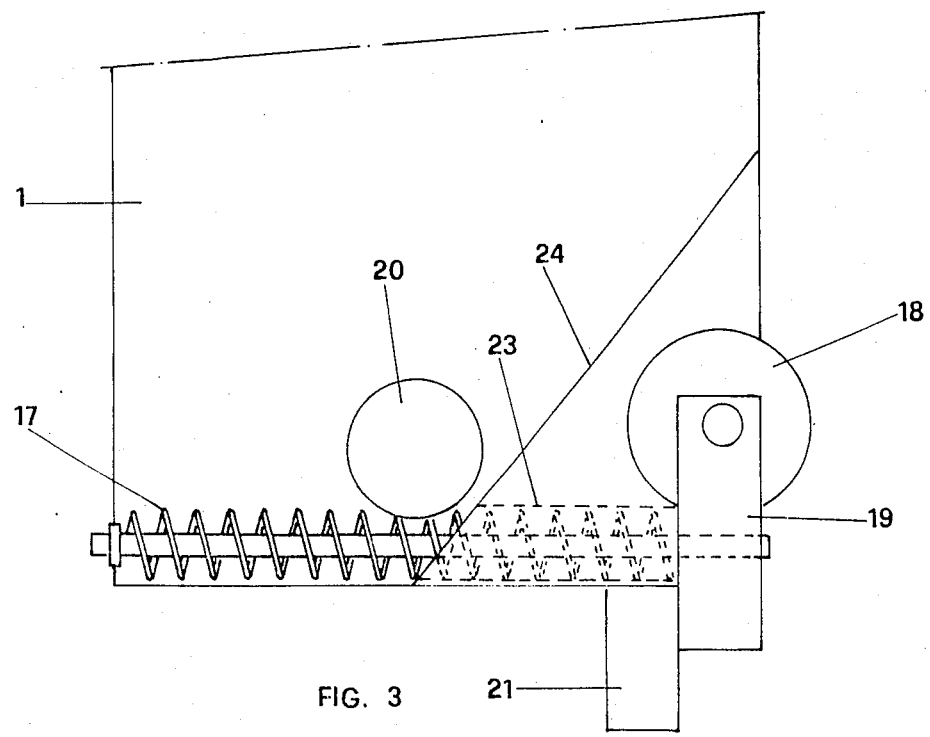
FIG. 3 shows a side view, in partial section, of the dispensing device with a rotating screw.

FIG. 3 shows that hopper 1 is fitted with a dispensing screw 17, helicoidal in type, rotated by electric motor 18, equipped with the helicoidal wheel endless screw reducer 19, a ball 20 being provided, moving on screw 17, in order to stir the product contained in the hopper and enable it to be dispensed through the outlet 21 by means of rotating screw 17. The part of screw 17 that is not immersed in the feed rotates inside a metal tube 23, in order first of all to measure out as accurately as possible the quantity of feed to be removed through tube 21 and, in addition, to prevent the feed from escaping into the space beneath the inclined plane 24.

This arrangement ensures that the hourly quantity of feed which descends through the outlet 21 is always constant and therefore the quantity can be varied for each dispensing cycle by adjusting the speed of rotation of screw 17. In other words, with a higher speed of rotation more feed will be dispensed into each feeding-trough, whereas vice versa, with a slower speed of rotation there will be a smaller quantity of feed dispensed from the hopper into the feeding-troughs. The necessary motors, respectively 9 (FIG. 1) to make the whole of the equipment move along the rails 4 and 6, and 25 to raise or lower hopper 1, along its guide upright 3, as well as 18 (FIG. 3) to rotate screw 17 positioned at the bottom of hopper 1, shall preferably be the direct current type, with supply batteries installed on the truck, this in order to avoid the presence of mobile electric contacts in a very damp environment, which could be extremely dangerous to the safety of the installation and the personnel.

The entire installation can therefore operate entirely automatically, thus the personnel will only have to refill the container 16 with the feed that supplies hopper 1 and regulate and monitor the speed of rotation of screw 17 dispensing the feed, according to the requirements of the poultry being reared.

The advantages inherent in the use of the equipment according to the invention are obvious and are due first of all to the fact that the entire complex of cages is supplied by means of a single mobile truck, with a single hopper, which is moved from one level to another at the end of each round.

The presence of a screw rotating at adjustable speed ensures that the feed is accurately measured into the different feeding-troughs.

The special circular section of the guide rails ensures their easy cleaning and, consequently, safe operation of the entire equipment.

The presence of three separate motors supplied by mobile batteries on the truck itself provides assurance against accidents due to faults in the electrical installation, which would be extremely dangerous in view of the environment in which it is situated.

It is evident that the equipment has now been described and illustrated in the attached drawings, in one particular form of constructional embodiment, indicated merely as a non-limiting example since it may take different forms and appearances, the essential characteristics of the invention remaining unchanged, without thereby departing from the sphere of the patent.

In particular the equipment may be applied to cages that are different in shape from the one illustrated in the attached figures, e.g. batteries of cages having a trapezoidal section or other shapes.

I claim:

1. Apparatus for the automatic and continuous dispensing of feed into the feeding troughs of batteries of cages for keeping poultry of the type which comprises a hopper (1), from which the feed is made to descent into the feeding troughs positioned opposite each cage, a frame bearing the cages, wherein said hopper (1) is movably mounted on a column (3), said column sliding horizontally by means of guide rollers (5, 7, 8) along a rail (4) at the bottom of said apparatus and an upper rail (6), said bottom and upper rails being prearranged on the sides of the cages to be supplied, a screw (17) at the bottom of said apparatus and partially immersed in said hopper, a motor (18) fitted with a reducer (19) for rotating said screw, a ball (20) moving on said screw, said ball stirring said feed, the quantity of feed being dispensed being determined by the rate of rotation of said screw, the upper and bottom rails presenting rectilinear portions, connected by curved portions which enable the apparatus to go from one side to the other of the cages and at the end of each passage of the hopper along all the cages of the same level, a motor (9) for driving one of said rollers (8), a control means compels the hopper to be displaced vertically to a different level for the purpose of beginning the supply to the cages of the new level along said battery of cages, thus permitting easy and automatic supply of feed at the different levels of the entire installation.

2. The apparatus according to claim 1 wherein one guide roller (5) rests on said bottom rail (4), one guide roller (7) is a check roller and rotates on a vertical pin fixed to an area projecting from said column (3) and a third guide roller (8) is equipped with a motor (9) to move said column along the side of said frame and runs on said upper rail (6), said third guide roller (8) acting in opposition to said check roller (7) and being located on the side of said rail (6) opposite to the side on which said check roller (7) is located, said check roller (7) urging against said frame by springing means.

3. The apparatus as to claim 1 wherein said upper rail (6) is fixed along each side of each battery of cages and said hopper (1) performs a course in the shape of a plurality of S's along said rail (6).

4. The apparatus according to claim 1 wherein sensors (22) are positioned at the beginning and end of each rectilinear stretch of rails positioned along the batteries of cages, in order to start and fix the end of the dispensing of feed into the feeding-troughs, preventing feed wastage in the stretches of the track that are outside the rectilinear stretches.

* * * * *